United States Patent Office 3,432,567
Patented Mar. 11, 1969

3,432,567
ALKYLARYL PRODUCTION
Edwin Kermit Jones, Kenilworth, Ill., assignor to Universal Oil Products Company, Des Plaines, Ill., a corporation of Delaware
No Drawing. Continuation-in-part of application Ser. No. 424,206, Jan. 8, 1965, This application Oct. 31, 1966, Ser. No. 590,490
The portion of the term of the patent subsequent to Apr. 4, 1984, has been disclaimed
U.S. Cl. 260—671      12 Claims
Int. Cl. C07c 3/50, 5/18; C11d 1/22

This application is a continuation-in-part of my co-pending application Ser. No. 424,206 filed Jan. 8, 1965, now Patent No. 3,312,734, Apr. 4, 1967, which is a continuation of application Ser. No. 280,070 filed May 13, 1963, now abandoned, which is a continuation-in-part of Ser. No. 79,576 filed Dec. 30, 1960, now abandoned.

This invention relates to a process for the production of detergents and other surface active agents containing a hydrophobic alkylaryl radical which is readily subject to bacterial attack during sewage treatment. More specifically, this invention relates to surfactant products and to the process for producing the same, said products consisting of substantially straight chain alkyl-substituted aromatic compounds formed by separating from certain naphtha fractions of petroleum a straight chain paraffin in which the number of carbon atoms in the paraffin corresponds to the number of carbon atoms in the alkyl group of the desired alkyl aromatic compound, dehydrogenating the recovered paraffin to form the corresponding straight chain mono-olefin, condensing the straight chain olefin with an aromatic compound to form an alkylaryl intermediate and thereafter converting the alkylate to said surfactant by a process which introduced a hydrophilic radical into the alkylate, for example, via sulfonation. The resulting product which contains both a hydrophobic and a hydrophilic group is a detergent product subject to bacterial attack and degradation in a subsequent sewage treatment process after the detergent has been used in a laundering or other cleaning operation and discharged into such sewage treatment facilities.

One of the major problems prevalent in centers of population throughout the world is the disposal of sewage and the inactivation of detergents dissolved in the sewage in even small quantities. Such a disposal problem is especially vexacious in the case of those detergents having an alkylaryl structure as the organic portion of the detergent molecule. These detergents produce stable foams in hard or soft waters in such large quantities that the foam clogs sewage treatment facilities and often appears in sufficient concentration in such facilities to destroy the bacteria necessary for sufficient biological action for proper sewage treatment. One of the principal offenders of this type of detergent is the alkylaryl sulfonates, which, unlike the fatty acid soaps, do not precipitate when mixed with hard water containing calcium or magnesium ions in solution and since these compounds are only partly biodegradable, the detergent persists in solution and is carried through the sewage treatment plant in substantially unchanged or still-active form. Having an abiding tendency to foam, especially when mixed with aerating devices and stirrers, large quantities of foam are discharged from the sewage digestion plant into rivers and streams where the continuing presence of the detergent is marked by large billows of foam on the surface of these streams. Other offenders of this type of detergent are the polyoxyalkylated alkylphenols and the polyoxyalkylated alkylanilines. These same synthetic detergents also interfere with the anaerobic process of degradation of other materials, such as grease and thus compound further the pollution caused by sewage plant effluents containing such detergents. These dilute detergent solutions often enter subsurfaces water currents which feed into underground water strata from which many cities draw their water supplies and the alkylaryl-based detergents find their way into the water supplies drawn from water-taps in homes, factories, hospitals and schools. Occasionally these detergents turn up in sufficient quantities in tap water to make drinking water foam as it pours from the tape.

Although the effluents from cities' sewage plants may be clear and appear non-contaminated, many tons of synthetic detergents which have resisted the sewage treatment and which have survived the bacterial action normally present in open surface streams cause the formation of large masses of foam at the bottom of weirs and dams in water streams fed by sewage plant effluents from cities whose population utilizes large quantities of synthetic detergents. During 1959 over 1.5 billion pounds of surface active agents (on the unbuilt basis exclusive of the inorganic salts added to commercial detergents) were sold in the United States. Of this quantity of synthetic detergents entering the sewage treatment facilities throughout the United States, it is estimated that 530 million pounds was of the bacterially incompletely degradable (hard), synthetic, alkylbenzene sodium sulfonate type.

An adequate supply of pure water, like clean air, is essential to the further growth and development of cities and the maintenance of human health standards. It has now been found that alkylaryl-based detergents, such as the sodium sulfonate derivatives of these alkylaryl hydrocarbons, phenols and amines are more readily degradable by sewage bacteria if the long chain alkyl substituent on the phenyl nucleus is of a simple, straight-chain configuration than if it is of a more complex branched chain structure. As an example, detergent compounds containing an alkylaryl hydrophobic group in which the alkyl side chain has a structure such as the following:

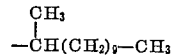

are more likely to be bacterially digested than detergents of the same chemical composition but in which the alkyl radical is a more highly branched chain, isomeric structure, such as:

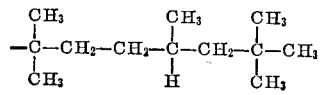

Thus, alkylaryl-based detergents in which the alkyl portion of the molecule has a relatively straight chain structure, such as the alkyl group illustrated in the first of the two structures above, produce biologically soft detergents which undergo bacterial degradation in the treatment of sewage and do not appear as active detergents in the effluents of such sewage treatment plants.

It is an object of this invention to produce a detergent containing an alkylaryl group in which the alkyl side chain attached to the aromatic nucleus has a relatively straight chain structure, capable of biological degradation during the treatment of sewage containing such detergents.

Another object of this invention is to provide an alkylating agent which when condensed with an alkylatable aromatic compound produces an alkylate having a structure suitable for the production of biologically soft detergents therefrom without sacrifice in the yield of product, effectiveness of the final detergent product of its water-solubility.

It is still another object of this invention to convert a relatively straight-chain paraffin to a relatively straight-chain olefin.

It is a further object of the present invention to dehydrogenate a straight chain paraffin to a straight chain mono-olefin with a non-acid dehydrogenation catalyst containing an alkali metal or metal compound thereon.

It is a further object of this invention to condense a straight-chain mono-olefin with an alkylatable aromatic to produce an alkyl aromatic which can be converted into a readily biodegradable detergent by the introduction of a hydrophilic group therein.

In one of its embodiments, this invention relates to a process for the production of an alkyl aromatic compound which comprises dehydrogenating a straight-chain paraffin having from about 10 to about 15 carbon atoms per molecule to a straight-chain mono-olefin by contacting said straight-chain paraffin with a non-acid dehydrogenation catalyst containing a support having an alkali metal or alkali metal compound thereon in concentrations of from about 0.1 to about 10 percent by weight at dehydrogenation conditions, mono-alkylating the straight chain mono-olefin with an alkylatable aromatic compound under alkylation conditions and recovering the alkyl aromatic compound.

Alkylaryl intermediate is a necessarily important precursor intermediate of the ultimate surface active product for it is the structure of the intermediate which determines the properties of the surface active product prepared therefrom, including its biodegradability. Thus, the alkylate intermediate, if an alkylaryl hydrocarbon, may be sulfonated and thereafter neutralized with a suitable alkaline base, such as sodium hydroxide to form an alkylaryl sulfonate (anionic) type of detergent which is most widely used for household, commercial and industrial purposes. The alkylate intermediate, if an alkylaryl hydrocarbon, is also capable of being converted to a non-ionic type of detergent by nitrating the alkylate to form a nuclearly mono-nitrated intermediate which on reduction yields the corresponding alkylarylamine. The amino radical is thereafter reacted with an alkylene oxide or an alkylene epichlorohydrin to form a polyoxyalkylated alkylarylamine (containing from 4 to about 30 oxyalkylene units) which is a highly effective detergent. Another large class of detergents based upon the alkylaryl portion of the molecule are the oxyalkylated phenol derivatives in which the alkylphenol base is prepared by alkylation of the phenol nucleus. Still other product shaving an alkylaryl base are widely known in the arts, although alkylaryl sulfonates provide the largest single source of stream pollution and therefore constitute the largest single class of surfactant products which can be synthesized from the straight-chain, olefins. The term "aryl" as used herein refers to a monocyclic aromatic nucleus which may be hydrocarbon or may contain various nuclear radicals as substituents, such as hydroxyl, amino, etc.

The source of the alkylating agent to provide the straight-chain alkyl group on the aromatic nucleus of the intermediate alkylate is the all-important variable in the process of synthesizing the relatively straight-chain alkylate intermediate from which the biodegradable surfactant product is prepared. In order to produce an alkylaryl intermediate, the alkyl group of which is a long chain aliphatic radical containing from 10 to about 15 carbon atoms, having a relatively straight-chain structure, the alkylating agent condensed with the aromatic receptor (aromatic hydrocarbon, phenol, etc.) must have a relatively straight-chain structure, since, at best, the alkyl chain attaching to the aromatic nucleus will have a secondary structure, even if a normal, 1-olefin is utilized as the alkylating agent in the condensation reaction with the aromatic reactant. The structure of the resulting secondary alkylate corresponds to the theoretical, predictable mechanism of alkyl transfer which holds that the entering alkyl chain attaches to the aromatic nucleus on the carbon atom of the mono-olefin chain having the least number of hydrogen atoms; therefore, even when a 1-olefin is utilized as the alkylating agent, a major proportion of the alkylate intermediate is the isomer corresponding to an aryl-substituted alkane in which the aryl group is attached to an internal carbon atom of the alkyl chain as follows:

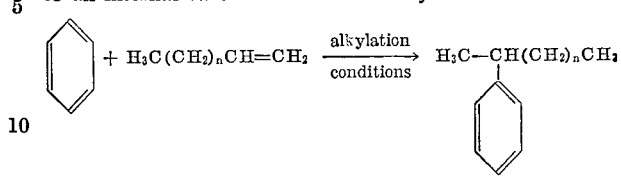

The degree of branching in the alkyl chain of the resulting alkylate intermediate will depend upon the degree of branching in the chain of the olefin utilized as the alkylating agent in the above reaction and therefore, normal 1-olefins, or any other straight-chain double bond position isomer, will produce a phenyl-substituted secondary alkane in which both of the alkyl chains attached to the secondary carbon atom of the resulting alkylate are straight-chain groups.

It is to be emphasized, however, that the biodegradability of the ultimate surface active product of this invention is not dependent upon an exclusively straight-chain structure of the alkyl portion of the molecule and those products formed by condensing other normal double bond position isomers in which the double bond is on an intermediate carbon atom of the chain (that is, on a carbon atom other than one of the terminal carbon atoms), such as a normal 5-alkene, also produce biodegradable surface active products.

It has now been found that one of the preferred sources of normal olefins which will yield, upon alkylation, alkylates in which the alkyl portion of the molecule has the maximum degree of linearity and a chain length of from 10 to about 15 carbon atoms are the normal paraffins present in a kerosene fraction of petroleum, dehydrogenated under controlled conditions to preserve the linearity of the olefinic product. The dehydrogenation of the normal paraffins must be effected at reaction conditions and in the presence of certain catalysts which minimize isomerization of the normal or straight-chain 1-olefins produced by dehydrogenation of the paraffins and which yield alkylates in which the alkyl group has maximum linearity.

Any suitable source of normal paraffins, of course, may be utilized for supplying the feed stock to the separation stage of the present process, including an appropriately boiling naphtha fraction of a straight run petroleum distillate, or of the products of the Fischer-Tropsch reaction which includes paraffinic hydrocarbons in the $C_{10}$–$C_{15}$ range formed by the reductive condensation of carbon monoxide, the hydrogenated products of ethylene polymerization which includes paraffins having from 10 to about 15 carbon atoms, and the hydrogenated fatty acids which upon complete reduction produce paraffinic hydrocarbons having straight-chain configuration. Other sources of paraffin hydrocarbons of whatever derivation are also contemplated herein as a source of paraffinic feed stock to the present process. The most widely available and generally preferred source of normal paraffins in the $C_{10}$ to $C_{15}$ range is a naphtha fraction boiling, for example, within the range of from about 150° to about 250° C. of kerosene. Most raw material sources of straight-chain paraffins, however, are mixtures containing a significant proportion of branched-chain isomers in admixture with the desired normal paraffins. These isomers, if converted along with the normal paraffins to their olefin analogs, do not exclusively yield the desired alkylates bearing a straight-chain nuclear alkyl substituent or a branched-chain alkyl group containing two branches, each of straight-chain structure. Consequently, in order to produce alkylate products containing alkyl groups of maximum linearity and the most advantageous properties insofar as its biodegradability is concerned the paraffinic fraction from which the olefin is prepared must be subjected to a suitable separation procedure which isolates the desired normal components from the mixture of paraffin isomers and homologs.

The separation and recovery of normal paraffins from hydrocarbon mixtures containing $C_{10}$ to $C_{15}$ components having a large number of isomeric configurations must be capable of selectively differentiating the normal isomers not only from the branched chain isoparaffins but also from cycloparaffins. Separating agents which have the capacity to segregate compounds on the basis of their molecular structure or configuration are referred to as "molecular sieves" and certain molecular sieves have sufficient selectivity to provide product streams of 99+ percent normal paraffin purity. One of the preferred molecular sieves of this type is characterized by its chemical composition as a dehydrated metal aluminosilicate having a zeolite structure in the crystals of aluminosilicate and containing pores of about 5 Angstrom units in cross-sectional diameter which are of sufficient size to permit the entry of normal aliphatic compounds but are not of sufficient size to permit the entry of branched chain or cyclic compounds. The metal constituent of these zeolitic compositions is selected from the alkaline earth metals, preferably calcium or magnesium, which are not only the most effective but also the least expensive of the various alkaline earth metal derivatives. These molecular sieve type sorbents are prepared by interaction of silica, alumina, an alkaline base and water to form a zeolitic, hydrous alkali metal aluminosilicate which precipitates from its aqueous solution as a mass of finely divided crystals; the recovered alkali metal derivative in the form of the hydrated zeolite is thereafter ion-exchanged with an alkaline earth metal salt and then dehydrated via calcination to form the desired 5 A. molecular sieves containing pores having cross-sectional diameters of about 5 Angstrom units. The preliminary alkali metal salt is prepared by combining water, sodium silicate (as "water glass"), or a silica sol, or an alcohol ester of silicic acid such as ethyl ortho-silicate, a source of alumina or aluminum hydroxide such as an alkali metal aluminate and sodium hydroxide in proportions sufficient to provide the following ratios of reactants, indicated as their oxides:

$Na_2O/SiO_2$ ---------------------------------- 1.0–3.0
$SiO_2/Al_2O_3$ -------------------------------- 0.5–1.3
$H_2O/Na_2O$ ---------------------------------- 35–200 and heating the aqueous mixture at a temperature of from about 40° to about 120° C. for a period up to about 40 hours or until crystal formation is complete, depending upon the temperature of the reaction. The crystals which precipitate are the sodium form of the metal aluminosilicate and have the following empirical composition:

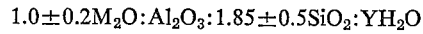
$$1.0 \pm 0.2 M_2O : Al_2O_3 : 1.85 \pm 0.5 SiO_2 : YH_2O$$

where M is sodium (if the sodium derivatives are involved in the preliminary preparation), although any of the other alkali metals may also be involved in the preparation, and Y has a value up to about 6. The calcium or other alkaline earth metal-exchange derivatives (have pore diameters of about 5 Angstrom units, which are required in the present process) are prepared by immersing the initial alkali metal derivative in an aqueous solution of an alkaline earth metal salt, such as calcium chloride solution. In the resulting ion-exchange at least a portion of the alkali metal ions in the initial metal derivative are replaced via ion-exchange by the alkaline earth ions present in the aqueous solution. The resulting hydrated crystals of the alkaline earth metal aluminosilicate derivative formed thereby are thereafter dried and calcined at temperatures of from about 150° to about 500° C. to dehydrate the water of crystallization from the silicate and thereby develop pores having diameters of about 5 Angstrom units, in which form the product is in its activated form as a molecular sieve for separating normal paraffins from their branched chain and cyclic isomers. A preferable molecular sieve is the Type A sieve described in U.S. Patent No. 2,882,243.

Another class of separating agents which are selective for normal compounds, including olefins if present in the hydrocarbon mixture, is urea which separates these components by the formation of an adduct or clathrate of the urea with the straight-chain compound. Thus, urea crystals or an aqueous solution at urea is mixed with the paraffinic or olefinic hydrocarbon mixture at a temperature of from about −10° to about 35° C., the crystalline adduct (or clathrate) forming immediately as the urea is mixed with the hydrocarbon fraction from which the normal components are to be separated. The crystals are filtered from the remaining liquid and thereafter separately decomposed by increasing the temperature of the separated crystals or by displacing the normal hydrocarbon bound to the urea in the form of the clathrate with a preferentially sorbed compound, such as an alcohol, including methanol, ethanol, normal propanol, etc., an aldehyde such as propionaldehyde, acetaldehyde, etc., or other aliphatic compound containing a polar radical.

The straight-chain hydrocarbon present in the mixture of hydrocarbon isomers may also be separated from the cyclic and isoparaffinic components present in the hydrocarbon mixture by contacting the mixture with thiourea which selectively forms adducts with the branched chain and cyclic components, leaving the normal hydrocarbons present in the mixture as a raffinate stream which may be withdrawn from the resulting thiourea clathrate. Separation procedures utilizing the above separating agents are well-known in the prior art and further reference thereto may be had for specific details of the process technique.

The straight-chain aliphatic hydrocarbon separated from the mixture of hydrocarbon isomers boiling in the kerosene range by one of the above-described separation procedures is, converted to an olefin by dehydrogenating the normal paraffins.

The conversion of the straight-chain paraffins recovered by the above separation procedure from the mixture of aliphatic and/or cyclic hydrocarbons to their mono-olefinic analogs is effected at temperatures of from about 400° to about 600° C. in the presence of a catalyst which promotes the dehydrogenation of the paraffins to the mono-olefins without isomerization of the normal paraffins or the resulting mono-olefins to their branched chain analogs, thereby preserving the straight-chain character of the molecule so that the olefin product is also of straight-chain structure. Suitable catalytic agents which minimize isomerization of the paraffinic feed stock and/or olefinic product are the neutral oxides of the elements of Group VI and the metals, sulfides and/or oxides of the metals of Group VIII of the Periodic Table, preferably the oxides of chromium, molybdenum and tungsten and the metals, oxides and sulfides of nickel, cobalt, platinum and palladium deposited on an inert support, especially a support free of acidic ions, and more preferably, alumina, the composite containing from 0.5 percent, up to about 20 percent by weight of the Group VI metal oxide, and more preferably from about 2 percent to about 10 percent by weight of the oxide and from 0.05 to 10 percent of the metal, oxide or sulfide of the Group VIII element. It is preferred that the above composite catalysts of this type contain from 0.1 to about 10 percent by weight of an alkali metal oxide, such as potassium, sodium or lithium oxide in order to maintain the catalyst on a non-acidic support.

The preferable catalysts for dehydrogenating the straight-chain paraffins comprise the noble metals or metal compounds especially platinum and palladium deposited on a neutral or basic support, that is a non-acidic support in order to prevent isomerization of either the straight-chain paraffins or the straight-chain mono-olefins. Alumina, which is the preferable support for the dehydrogenating catalyst, is generally considered a neutral or slightly acidic support and the alkali metal oxide or basic alkali metal compounds serve to neutralize the alumina support. Preferable concentration range of alkali metal is from about 0.1 to about 2.0 weight percent of the finished catalyst. Of the three above alkali metals, lithium is the most preferred. In some instances, rubidium or cesium may also be employed. Other neutral supports may also be employed such as charcoal but it is preferred to employ an alkali metal oxide on any of the possible supports. The noble metal acts as a dehydrogenation promotor to convert the straight-chain paraffin to the straight-chain mono-olefin. When using Group VI or non-noble Group VIII metal dehydrogenation promoters, concentrations of from about 0.5 to about 20 percent by weight are suitable whereas when employing noble Group VIII metal promoters, concentrations of from about 0.05 to about 2 percent by weight are preferred. An especially preferable dehydrogenation catalyst comprises an alumina support having about 0.5 weight percent lithium and 0.75 weight percent platinum. Optionally, additional materials may be incorporated into the catalyst to modify the activity of the platinum such as a metal component selected from arsenic, antimony and bismuth in concentrations such that the atomic ratio of the metal component to the platinum is from about 0.2 to about 0.5.

The dehydrogenation reaction is preferably effected at relatively short contact periods between the catalyst and feed stock paraffins and at a pressure in the region of from atmospheric to a maximum of about 100 p.s.i.g. Thus, the flow rate of the feed stock through the bed of catalyst should be maintained at a rate corresponding to a liquid hourly space velocity of from about 1.0 to about 40 volumes of liquid per volume of catalyst per hour and preferably from about 5 to about 20. In the preferred process, the reaction is preferably effected in the presence of hydrogen, in order to reduce the deposition of carbon on the catalyst during the reaction, although the conversion is not dependent upon the presence of hydrogen in the reaction zone. Generally, less than about 15 and preferably from 0.5 to 10 moles of hydrogen per mole of hydrocarbon provide suitable hydrogen to hydrocarbon ratios for the conversion. The conversion of the normal paraffin charge stock to the mono-olefin analog corresponding thereto does not necessarily go to completion in a once-through passage of the charge stock through the catalyst bed. The unreacted normal paraffins and the mono-olefins are preferably directly sent to the alkylation zone where the mono-olefins are alkylated with the alkylatable aromatic. The effluent from the alkylation zone is readily separated into an aromatic fraction, a straight-chain paraffin fraction and an alkylate fraction. The straight-chain paraffin fraction is thereupon recycled to the dehydrogenation zone where they are exposed to further dehydrogenation. Thus, in the overall scheme, the normal paraffins are eventually completely converted to mono-olefins. In some cases it may be desired to separate the mono-olefins from the straight-chain paraffins using an absorbent such as silica gel or activated charcoal.

It is noted that all catalysts known generally for their dehydrogenation ability will not necessarily be equally effective to produce the desired normal mono-olefin upon contact of the normal paraffin with the catalyst at dehydrogenation conditions. Thus, dehydrogenation catalysts containing an acidic component such as a catalyst support containing combined chloride or other halogen in the catalyst composition, although they effect the desired dehydrogenation, also cause isomerization of the normal paraffins to various branched chain olefins which upon subsequent alkylation and conversion of the resulting alkylate to detergent products yield materials which have an alkyl chain of branched chain structure possessing the aforementioned resistivity to biodegradation. Accordingly, the aforementioned neutral and basic catalyst compositions, particularly the preferred alkali metal oxide catalysts are especially desirable for effecting the dehydrogenation of normal paraffins.

Following dehydrogenation of the normal paraffins in the dehydrogenation reaction product, the n-olefin is utilized as an alkylating agent for the aromatic reactant comprising the hydrophobic group in the structure of the present surfactants, selected from the group consisting of benzene, toluene, xylene, ethylbenzene, methylethylbenzene, diethylbenzene, phenol and mono-nitrobenzene, yielding a mono-alkylate which is the essential intermediate in the surfactant product of this invention. The alkylation reaction is effected in the presence of a suitable catalyst capable of promoting the condensation reaction, generally an inorganic material characterized as an acid-acting compound which catalyzes the alkyl transfer reaction involved in the process. Acid-acting inorganic compounds having alkylating activity include certain mineral acids, such as sulfuric acid containing not more than about 15 percent by weight of water and preferably less than about 8 percent by weight of water, including used sulfuric acid catalysts recovered from the alkylation of isoparaffins with mono-olefins, hydrofluoric acid of at least 83 percent concentration and containing less than about 10 percent by weight of water, liquefied anhydrous hydrogen fluoride, anhydrous aluminum chloride or aluminum bromide, boron trifluoride (preferably utilized in admixture with concentrated hydrofluoric acid), and other acid-acting catalysts. The catalyst particularly preferred for the present alkylation reaction is hydrogen fluoride containing at least 83 percent and more preferably at least 95 percent hydrogen fluoride. Especially preferable is anhydrous hydrogen fluoride. Sulfuric acid of at least 85 percent concentration, up to 100 percent, is also a preferred catalyst.

In the process of condensing the aromatic starting material with the mono-n-olefin, the hydrogen fluoride, for example, in liquid phase and the aromatic compound alone, or in admixture with the mono-n-olefin, are charged into a stirred pressure autoclave, followed by adding the mono-n-olefin separately to the aromatic reactant and catalyst mixture, the resulting mixture being thereafter maintained, as the stirring continues, at a temperature of from about $-20°$ C. to about $70°$ C. and preferably from $20°$ C. to about $60°$ C. until alkylation is complete. In order to maximize the production of the desired mono-alkylate from the alkylating agent charged to the process, it is generally preferred that the molar ratio of aromatic compound to alkylating agent be greater than 1:1, and more preferably within the range of from about 2:1 to about 15:1 moles per mole. The reaction effluent is a mixture which is separated to recover the organic portion from the used catalyst, the organic mixture thereafter being distilled to recover the excess aromatic reactant, the straight-chain paraffins, and the alkylaromatic product as separate fractions. In most instances, when the molar proportion of aromatic reactant to mono-olefin charged to the process exceeds 1:1 and more desirably from about 5:1 to about 10:1, the mono-olefin is more or less completely consumed during the condensation reaction and a mono-alkylate rather than the undesired poly-alkyl-substituted aromatic is obtained as the principal product of the process.

The alkylate constitutes the raw material or starting stock for the preparation of the ultimate detergent or surface active product. Thus, a highly effective detergent is prepared from an alkyl aromatic hydrocarbon by sulfonation producing the sulfonic acid derivative which is preferably neutralized with an alkaline, salt-forming base such as sodium hydroxide to form a water-soluble alkylaryl sulfonate detergent. The alkylate when an alkylaryl hydrocarbon may also be nitrated to form a nuclearly-substituted mono-nitro derivative which is thereafter catalytically reduced to the mono-amino-substituted analog (e.g., analkylaniline, analkyltoluidine, etc.). This amine is thereafter condensed with ethylene oxide or propylene oxide to introduce the hydrophilic polyoxyalkylene group on the amino nitrogen atom, forming thereby the corresponding polyoxyalkylated detergent product which preferably contains from 10 to about 30 oxyalkylene units per molecule of aromatic. In the case of the phenol, the cresol and xylenol alkylates, these are converted directly to detergent products via oxyalkylation with ethylene or propylene oxide (preferably, ethylene oxide) until the product contains from 4 to about 30 oxyalkylene units per molecule of alkylphenol. In the oxyalkylation of both the alkylaryl amines and alkyl phenols, the condensation is catalyzed by the presence of an alkaline catalyst such as sodium hydroxide in the reaction mixture.

The present invention is further described in the following illustrative examples, which, however, are not presented for the purpose of limiting the scope of the invention, but for purposes of illustrating several embodiments of the present process.

EXAMPLE I

In the following comparative preparations a straight-run petroleum fraction (recovered from a Michigan crude oil), boiling within the range of from about 170° to about 225° C. and having the following composition according to the general classes of the hydrocarbons present:

| | Percent |
|---|---|
| $C_{10}$–$C_{15}$ aliphatic paraffins | 73 |
| $C_9$–$C_{15}$ naphthenes | 24 |
| $C_8$–$C_{15}$ aromatic | 3 | is resolved into the following two classes of components: (1) straight-chain or normal paraffins and (2) a mixture of isoparaffinic and cyclic hydrocarbons. The recovered normal paraffins are thereafter dehydrogenated to their mono-olefin analogs and these are thereafter used to alkylate benzene to form phenyl-substituted normal alkanes, the recovered benzene alkylate is sulfonated, followed by neutralization of the resulting sulfonic acid to the alkylaryl sulfonate salt, a water-soluble, biodegradable or "soft" detergent. This product is then compared (as to detergency and biodegradability) to the corresponding sulfonate salt of the alkylate formed by alkylating benzene with the mixture of branched chain olefins contained in a propylene tetramer fraction boiling from about 170° to about 225° C. In each case the alkyl groups in the phenyl alkanes formed from the dehydrogenated n-paraffins and the propylene tetramer contain the same average number of carbon atoms per alkyl group.

In the first step of the reaction sequence, the normal parafins in the straight-run fraction are separated therefrom by contacting the mixture with pelleted calcium aluminosilicate molecular sieves (Linde Air Products Co., 5A molecular sieves) which selectively sorb the normal paraffinic components of the mixture and leave a non-sorbed raffinate consisting of isoparaffins and the cyclic hydrocarbons present in the fraction. For effecting this separation, the straight-run kerosene fraction is poured at room temperature (25° C.) into a vertical column packed with the molecular sieve pellets; the resulting column is 5 feet in length and contains 3.8 feet$^3$ of the pellets, each having a dimension of approximately 1/8″ × 1/8″. A raffinate effluent from the bottom of the column of molecular sieves consists of n-paraffin-free hydrocarbons. The normal paraffin components of the kerosene fraction (about 37% of the total volume of kerosene) remain within the column, sorbed on the molecular sieve particles. The residual raffinate retained on the surface of the pellets is washed from the column by dumping isopentane into the top of the column and draining the wash effluent from the bottom of the column. Any isopentane remaining on the pellet surfaces is separated from the recovered n-paraffin sorbate product by distillation. Raffinate contained in the wash effluent is recovered as bottoms on distillation of the wash effluent.

After completely draining the column of isopentane wash, the n-paraffins sorbed from the kerosene feed stock are desorbed by filling the column with liquid n-pentane at 25° C., allowing the n-pentane to displace by the mass action effect the kerosene-derived n-paraffins present in the pores of the molecular sieve particles and after 10 minutes the liquid surrounding the sorbent particles is drained into a distillation flask. The column is again filled with n-pentane and after standing for an additional 10 minutes, he liquid in the column is drained into a second distillation flask. Distillation of the n-pentane from the effluent stream in each case left a residue of kerosene n-paraffins (98.5 percent normal components of $C_{11}$–$C_{15}$ chain length) in each flask, 96 percent of the total recovered sorbate being in the first flask.

The n-paraffins recovered from the kerosene fraction in the above run are thereafter dehydrogenated by passing the mixture together with a small proportion of hydrogen (about one mole of recycle hydrogen per mole of hydrocarbon) at a high rate of flow through a small pilot plant dehydrogenation reactor consisting of a steel pipe 3 feet in length packed with an alumina-supported cobalt thiomolybdate catalyst containing 5 percent by weight equivalent of cobalt and 0.5 weight percent lithium, the reactor being jacketed with a thermostatically controlled electric heating element which maintains the catalyst bed at about 520° C. and at a pressure of about 10 to 15 p.s.i.g. during the passage of the paraffinic charge stock through the bed of catalyst. The feed stock charge rate (in terms of liquid hourly space velocity) is 3.5 volumes of charge per volume of catalyst per hour. The product effluent from the bottom of the reactor is cooled and liquefied in a water-cooled condenser, the non-condensed gases being withdrawn overhead from the condenser. A yield of mono-olefins representing 73 percent by weight, based on the normal paraffin charged is recovered from the dehydrogenation reaction product. The olefinic product, however, contains a significant proportion of cyclo-olefins which are separated from the desired n-olefins by solvent extraction utilizing triethylene glycol containing 7.5% by weight of water as solvent and an apparatus consisting of an extraction column of the perforated plate type at a temperature of 190° C. and at 100 p.s.i.g. pressure. The hydrocarbon feed stream undergoes extraction at liquid-liquid countercurrent flow conditions, with the n-olefin-containing stream being recovered as raffinate The olefinic dehydrogenation product of the normal paraffin feed stock is made up of various doublebond position isomers and the desired olefins are recovered from the unconverted paraffins by passing the liquid dehydrogenation product through a column of activated silica gel particles, the olefinic component being retained by the silica gel, with the paraffins passing through the column as raffinate. The olefins are recovered from the silica gel by displacement of the mono-olefin adsorbate with benzene, a preferentially adsorbable compound.

The n-olefins recovered by the above procedure are then mixed with 10 molar proportions of benzene, based on the average molecular weight of the olefins as 168 (dodecane) and the hydrocarbon mixture cooled to 0° C. as enough hydrofluoric acid of 98.5 percent concentration is added (with stirring) to provide a weight ratio of acid to olefins of 1.5. The mixture is maintained at a temperature within the range of from 0 to 10° C. during a period of one hour after which the mixture is allowed to settle and the lower acid layer withdrawn from the upper hydrocarbon layer. The hydrocarbon phase is then washed with dilute caustic to remove dissolved hydrogen fluoride and then distilled to remove excess benzene and a small quantity of aliphatic hydrocarbons boiling in the mono-olefin range. The residue, consisting of 96 percent monoalkyl-benzenes represents an 82 percent by weight yield of alkylate, based upon the olefins charged.

The alkylate product, when subjected to intra-red analysis contains of secondary alkylbenzenes (phenyl-substituted normal alkanes) of the following structure:

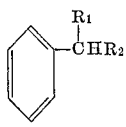

in which $R_1$ and $R_2$ are normal or straight-chain alkyl radicals of from 1 to 13 carbon atoms in chain length and in which $R_1+R_2$ is from 9 to 14, a substantial proportion of the product being of the structure in which $R_1$ is methyl and $R_2$ is n-tridecyl.

A second sample of alkylate is prepared by alkylating benzene with a so-called propylene tetramer fraction boiling from about 170° to about 225° C. in accordance with the same procedure specified above for the n-olefin alkylate production. Propylene tetramer consists of a mixture of isomers and homologs all of which are of branched chain structure of the following type:

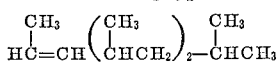

A third sample of alkylate is prepared by separating straight-chain paraffins from a kerosene boiling range hydrocarbon over 5A molecular sieves similar to the above procedure. The normal paraffins are introduced into a fixed bed reactor containing a catalyst having 0.75 weight percent platinum, 0.50 weight percent lithium and an arsenic to platinum atomic ratio of 0.47 on an alumina support. The operating conditions maintained in the reactor are catalyst bed inlet temperatures of 475° C., pressure of 10 p.s.i.g., hydrogen to hydrocarbon mole ratio of 8.0 and a liquid hourly space velocity of 16.0. The results show a conversion of 21.4% with a selectively of 84.1% to straight-chain mono-olefins. The normally liquid dehydrogenation reactor effluent after separation and recycle of a hydrogen rich gaseous phase, is introduced into an alkylation zone along with sufficient benzene such that the benzene to olefin mole ratio is about 10:1. Hydrogen fluoride is added to the alkylation zone to provide an HF/hydrocarbon (excluding the normal paraffins) volume ratio of about 1.5:1 and the zone is maintained at a temperature of 100° F., a pressure of about 250 p.s.i.g. and a contact time (between HF and hydrocarbons) of slightly less than two minutes. The hydrocarbon portion of the alkylation product effluent is separated from the hydrogen fluoride catalyst by washing and stripping and is passed into a fractionating column wherein a benzene portion, a normal paraffin portion and an alkylate portion are separated. The normal paraffin portion is recycled to the dehydrogenation zone and the alkylate is recovered.

Each of the alkylates prepared as indicated above are sulfonated by mixing the alkylate with an equal volume of liquefied n-butane and then with 30 percent oleum which is added to the diluent alkylate mixture as a small stream flowing onto the chilled surface of a rotating cylinder, the surface of the cylinder being cooled by circulating salt water at —10° C. on the inside of the cylinder as the latter is rotated. The sulfonation mixture is scraped from the surface of the cylinder and the mixture respread on the cylinder by a stainless steel blade, the n-butane evaporating into a hood as the heat of reaction raises the temperature and boils off the butane, thereby maintaining the temperature at or near the boiling point of n-butane at about 0° C.

The sulfonated reaction mixture removed from the rotating cylinder is diluted by mixing with ice water. The resulting sulfonic and sulfuric acids dissolved in the aqueous solution are neutralized to a pH of 7 with sodium hydroxide and unreacted alkylate (less than 2% by weight of alkylate charged) was extracted from the aqueous solution with ether. The products are crystalline, cream-colored solids which are completely soluble in water. The evaporated solids are extracted with 70 percent ethanol and the ethanol extract evaporated to dryness to recover sodium sulfate-free products. The product is thereafter mixed with sufficient sodium sulfate builder salt to detergent compositions containing a 20–80 weight ratio of sodium alkylaryl sulfonate and sodium sulfate. Each composite product when tested for detergency in a standard Launder-O-Meter test procedure effectively removed a synthetic soil composition from cotton cloth (muslin swatches). The product prepared from the propylene tetramer alkylate is rated as about 98% as effective as pure sodium oleate, the product prepared from the former n-olefin alkylate is rated at about 102% and the latter n-olefin alkylate at about 104% as effective as the standard sodium oleate at equal concentrations. Using distilled water at 160° F. to prepare a 0.3 percent aqueous solution of the alkylaryl sulfonate detergents and the sodium oleate, the detergency of each sample of detergent was measured by determining the reflectance of white light from the cotton muslin swatch samples laundered in each detergent solution separately and thereafter comparing the reflectance therefrom with a sample laundered in the sodium oleate standard solution at the same conditions and at the same concentration of surfactant in solution.

Samples of each of the above detergent preparations are separately subjected to simulated sewage treatment conditions in order to determine the relative rates of removal and the extent of disappearance of each of the samples from a synthetic sewage mixture of known composition. A 0.003 percent aqueous solution of each of the above detergents (100 gallons each) is prepared and to each of the solutions 0.5 lb. of urea (to supply nitrogen nutrient), 0.2 lb. of sodium sulfate (to supply —$SO_4$ nutrient), 0.2 lb. of potassium phosphate (to supply —$PO_4$ nutrient) and trace quantities of zinc, iron, magnesium, manganese, copper, calcium and cobalt are added to provide the necessary nutritional requirements of the bacteria added to each of the solution. The latter bacteria were supplied in the form of a 1 lb. cake of activated sewage sludge recovered from a sewage treatment plant. The simulated sewage composition, placed in a large circular tank, is thereafter stirred as air is introduced into the bottom of the tank in the form of fine bubbles through fritted glass nozzles. Approximately 50 cc. samples of the sewage suspension are removed from each of the tanks at three-hour intervals after an initial digestion of 24 hours, filtered, and equal quantities of the filtrate (50 cc.) measured into shaker bottles to determine the height of foam produced after shaking each of the samples of filtrate under similar test conditions. 50 cc. samples of each of the initial, non-digested detergent solutions, shaken for 10 minutes in the test apparatus produced essentially equal volumes of foam (i.e., foam 15 cm. in height). The results of foam height determinations for each of the solutions samples thereafter, an empirical measure of the amount of detergent remaining in solution, are presented in the following Table I for each of the samples and after the indicated periods of bacterial digestion; the foam height is thus an inverse indication of biodegradability of the surfactant sample being tested.

TABLE I.—QUANTITY OF FOAM PRODUCED FROM 50 CC. SAMPLES OF SEWAGE SOLUTION AT VARIOUS INTERVALS OF SEWAGE TREATMENT TIME

| Sample No. | Time of treatment, hrs. | Foam height, cm. | | |
|---|---|---|---|---|
| | | Propylene tetramer alkylate | Former n-olefin alkylate | Latter n-olefin alkylate |
| 1 | 0 | 15 | 15 | 15 |
| 2 | 24+3 | 15 | 13 | 13 |
| 3 | 24+6 | 14 | 12 | 11 |
| 4 | 24+9 | 13.5 | 10 | 8 |
| 5 | 24+12 | 13 | 8 | 6 |
| 6 | 24+15 | 13 | 7 | 4 |
| 7 | 24+18 | 12.5 | 6 | 3 |
| 8 | 24+24 | 11.5 | 5 | 2 |
| 9 | 48+12 | 11 | 4 | 0.5 |
| 10 | 60+12 | 10.5 | 2 | Nil |
| 11 | 60+24 | 10 | 1 | Nil |

The sample of detergent prepared from the branched chain (tetramer) alkylate remains active (i.e., produced foam) even after 108 hours.

EXAMPLE II

A run similar to the above, utilizing detergent samples prepared by oxyethylating phenol alkylates, containing an average of about 18 oxyethylene units per alkylphenol unit, one sample of which contains a $C_{12}$ alkyl group derived from propylene tetramer and the other sample of which is a $C_{12}$ alkyl group derived from a normal olefin produced by dehydrogenation of a normal paraffin separated from a straight-run naphtha, utilizing a molecular sieve sorbent, as described in foregoing Example I, further confirmed the more rapid biodegradation of surfactants prepared from straight-chain alkylating agents, as distinguished from detergents prepared from the propylene tetramer or branched chain alkylating agent.

I claim as my invention:

1. A process for the production of an alkyl aromatic compound which comprises dehydrogenating a straight-chain paraffin having from about 10 to about 15 carbon atoms per molecule to a straight-chain mono-olefin by contacting said straight-chain paraffin at dehydrogenating temperature with a non-acid dehydrogenation catalyst containing a support having an alkali metal or alkali metal compound thereon in concentrations of from about 0.1 to about 10 percent by weight at dehydrogenation conditions, monoalkylating the straight chain mono-olefin with an alkylatable aromatic compound under alkylation conditions and recovering the alkyl aromatic compound.

2. The process of claim 1 further characterized in that the dehydrogenation catalyst comprises a dehydrogenation promotor selected from the group consisting of the metals and metal compounds of Groups VI and VIII of the Periodic Table.

3. The process of claim 2 further characterized in that the alkylatable aromatic is selected from the group consisting of benzene, toluene, xylene, ethylbenzene, methylethylbenzene, phenol, diethylbenzene and mono-nitrobenzene.

4. The process of claim 3 further characterized in that the dehydrogenation promotor is selected from the group consiting of platinum, palladium and compounds thereof.

5. The process of claim 4 further characterized in that the alkali metal is selected from the group consisting of sodium, potassium and lithium.

6. The process of claim 5 further characterized in that the alkali metal is lithium in a concentration of from about 0.1 to about 2 percent by weight of the dehydrogenation catalyst and the dehydrogenation promoter is platinum in a concentration of from about 0.05 to about 1.5 percent by weight.

7. The process of claim 6 further characterized in that the dehydrogenation conditions comprise temperatures of from about 400 to about 600° C., pressures of from about atmospheric to about 100 p.s.i.g., and the presence of hydrogen and the alkylation conditions comprise a hydrogen fluoride catalyst, temperatures of from about −20° C. to about 70° C., and pressures high enough to maintain liquid phase in the alkylation step.

8. The process of claim 7 further characterized in that the normally liquid effluent from the dehydrogenation step is introduced into the alkylation step, the organic phase from the alkylation step is separated into a straight-chain paraffin fraction, an alkylatable aromatic fraction and a mono-alkylate fraction, the paraffin fraction being recycled to the dehydrogenation step and the alkylatable aromatic fraction being recycled to the alkylation step.

9. The process of claim 1 further characterized in that the alkyl aromatic mono-alkylate is converted to a detergent product by introducing a hydrophilic group into the aryl nucleus of the mono-alkylate.

10. A process for the production of an alkyl aromatic compound which comprises dehydrogenating a straight-chain paraffin having from about 10 to about 15 carbon atoms per molecule to a straight-chain mono-olefin by contacting said straight-chain parafin, at dehydrogenating conditions including a liquid hourly space velocity of from about 5 to about 40 volumes of liquid feed per volume of catalyst per hour, with a non-acid dehydrogenation catalyst comprising a platinum group metal promoter on a support having an alkali metal or alkali metal compound thereon in a concentration of from about 0.1 to about 10 percent by weight, mono-alkylating the straight chain mono-olefin with an alkylatable aromatic compound under alkylation conditions and recovering the alkyl aromatic compound.

11. The process of claim 10 further characterized in that the total normally liquid effluent from the dehydrogenation step, comprising unreacted straight-chain paraffin and mono-olefin, is passed directly to the alkylation step.

12. The process of claim 10 further characterized in that said dehydrogenation catalyst comprises a modifier selected from the group consisting of arsenic, antimony and bismuth in a concentration such that the atomic ratio of modifier to platinum group metal is from about 0.2 to about 0.5.

References Cited

UNITED STATES PATENTS

| | | | |
|---|---|---|---|
| 2,964,577 | 12/1960 | Nace et al. | 260—683.3 X |
| 3,126,426 | 3/1964 | Turnquest et al. | 260—683.3 |
| 2,972,644 | 2/1961 | Holmes et al. | 260—668 |

FOREIGN PATENTS 612,036   4/1962   Belgium.

DELBERT E. GANTZ, *Primary Examiner.*

C. R. DAVIS, *Assistant Examiner.*

U.S. Cl. X.R.

260—505, 624, 645, 683.3